United States Patent [19]
Callahan et al.

[11] 4,042,153
[45] Aug. 16, 1977

[54] LIQUID DROPPING DEVICE

[75] Inventors: James L. Callahan, Wooster; Arthur F. Miller; Wilfrid G. Shaw, both of Lyndhurst, all of Ohio

[73] Assignee: The Standard Oil Company, Cleveland, Ohio

[21] Appl. No.: 632,536

[22] Filed: Nov. 17, 1975

Related U.S. Application Data

[63] Continuation-in-part of Ser. No. 341,179, March 14, 1973, abandoned.

[51] Int. Cl.² .............................................. B65D 37/00
[52] U.S. Cl. ................................... 222/207; 222/422; 417/478
[58] Field of Search ..................... 222/207, 420–422; 417/478, 472, 473

[56] References Cited

U.S. PATENT DOCUMENTS

| 2,562,552 | 7/1951 | Henry | 417/478 X |
| 3,359,910 | 12/1967 | Latham, Jr. | 417/478 X |

FOREIGN PATENT DOCUMENTS

| 555,326 | 8/1943 | United Kingdom | 417/478 |

Primary Examiner—Stanley H. Tollberg
Assistant Examiner—Hadd Lane
Attorney, Agent, or Firm—Herbert D. Knudsen; David J. Untener

[57] ABSTRACT

Distinct droplets of a slurry are dispersed by a dropping device consisting of a resilient tube connected to a liquid reservoir so that the liquid flows through the tube, and two valves and a plunger which work in a six-movement cycle on the outer surface of the resilient tube to discharge uniform droplets of liquid at equal drop intervals.

3 Claims, 10 Drawing Figures

LIQUID DROPPING DEVICE

CROSS REFERENCE TO RELATED APPLICATIONS

This application is a continuation-in-part of my co-pending application Ser. No. 341,179 filed Mar. 14, 1973, now abandoned.

BACKGROUND OF THE DISCLOSURE

A number of dropping devices designed to produce distinct droplets are known. See for example U.S. Pat. Nos. 2,931,067; 3,208,101; 3,341,087 and 3,642,393. In each of these devices there is no bottom valve which controls the flow of liquid. The orifice restriction only restrains the liquid. U.S. Pat. No. 2,931,067 shows a pulsation which forces droplets of liquid through orifices in the bottom of the dropping device. U.S. Pat. No. 3,208,101, FIG. 6 shows how droplets can be formed using a bell and a ram to force droplets from an open tube. These devices are undesirable for preparing uniform droplets of a slurry at uniform time intervals.

SUMMARY OF THE INVENTION

It has now been discovered that the formation of uniform droplets at uniform time intervals can be accomplished by the liquid dropping device of the present invention. The device consists of a resilient tube attached to a liquid reservoir in such a manner that liquid flows through the tube. Along the outer surface of the resilient tube are two valves and a plunger that operate on the outer surface of the tube in such a manner that liquid is dispersed in a six-movement cycle. The invention is best understood by reference to the drawing.

DESCRIPTION OF THE DRAWING

Referring to FIG. 1, the dropping device consists of a liquid reservoir 1 and a resilient tube 2 extending downward from the liquid reservoir and attached to the bottom of the liquid reservoir so that liquid from the reservoir flows from the reservoir and through the tube. The level of liquid in the reservoir is controlled at a given level, and the liquid in the reservoir may be stirred to maintain a uniform composition.

Along the outer edge of the resilient tube 2 is a back plate 3. On the opposite side of the resilient tube are valves 4 and 5 and plunger 6. The valves 4 and 5 and plunger 6 are maintained in the open position by spring action and are moved to a closed position by the action of individual cams working against the spring. The movement of the cams is controlled so that the appropriate sequence of steps shown in FIGS. 1-6 is accomplished.

In the closed position, valves 4 and 5 prevent the flow of liquid through the resilient tube 2 by restriction caused between the valve and the back plate 3. The action of the plunger 6 against the resilient tube 2 displaces liquid in at least a portion of the tube and discharges a droplet from the end of the tube.

Figure 1:
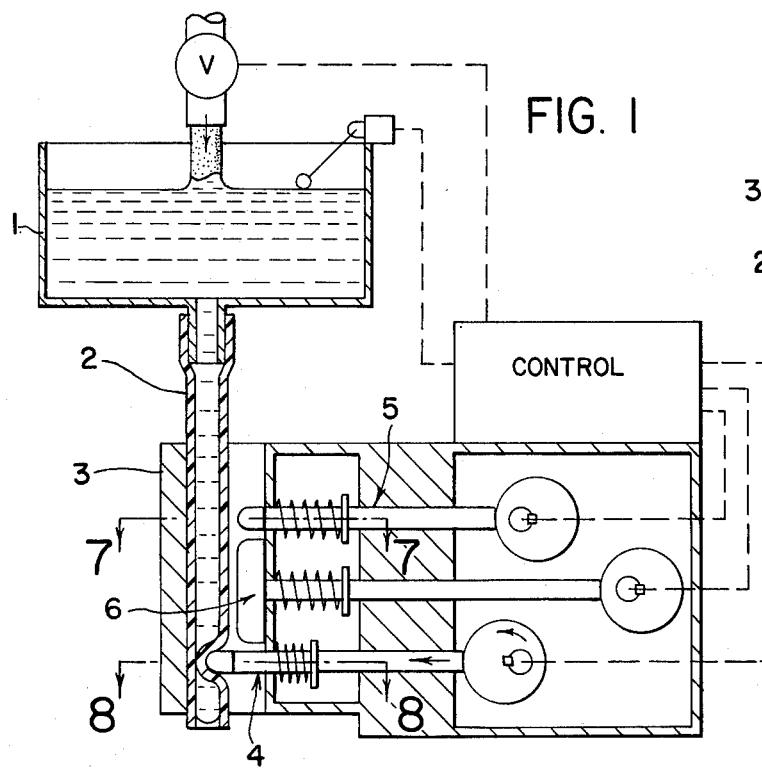
FIG. 1 shows the total dropping device and one of the positions of the valves and plunger.
Figure 2:
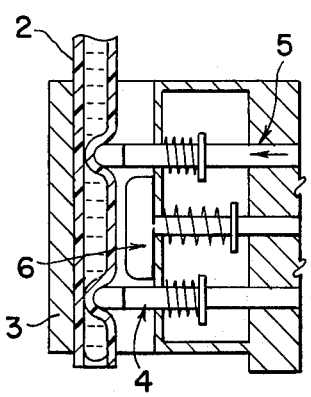
FIGS. 2-6 show the other five positions of the valves and plunger.
Figure 3:
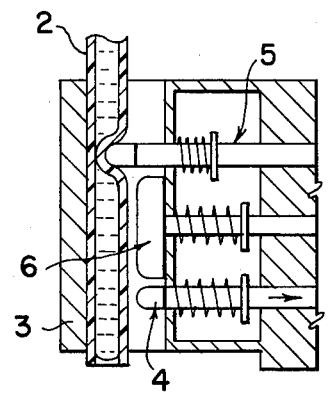
Figure 4:
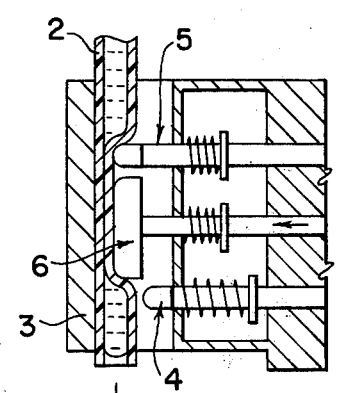
Figure 5:
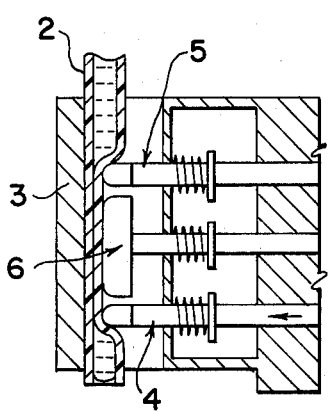
Figure 6:
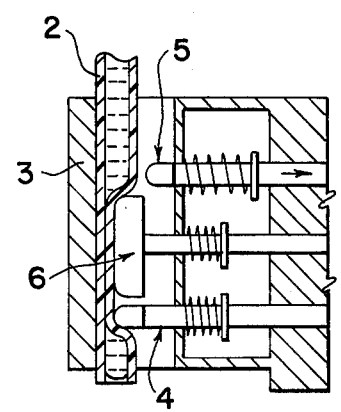

The positioning of the valves and plunger in FIG. 1 show the step where the flow of liquid through the tube is prevented by the valve 4. FIG. 2 shows the step where liquid is trapped between closed valves 4 and 5. FIG. 3 shows the opening of valve 4 in preparation for the drop. FIG. 4 shows the displacement of the liquid by the action of the plunger to produce a droplet from the end of the tube. FIG. 5 shows the closing of the valve 4, and FIG. 6 shows the step preparing the resilient tube for filling.

Figure 7:
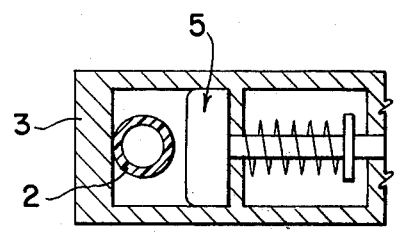
FIG. 7 shows the top cross-sectional view of a valve in the open position along section line 7 and FIG. 8 shows the top cross-sectional view of the valve in the closed position along section line 8.
Figure 8:
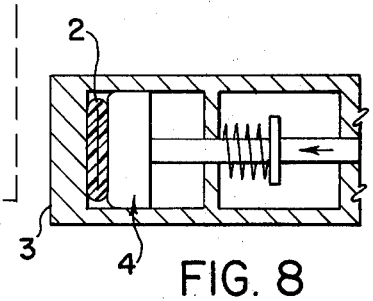

FIGS. 7 and 8 show the top cross-sectional view of the valves. In the open position, the valve allows flow of liquid through resilient tube 2 and in the closed position, FIG. 8, the valve operates along the entire width of the tube to prevent flow of liquid through the tube.

Figure 9:
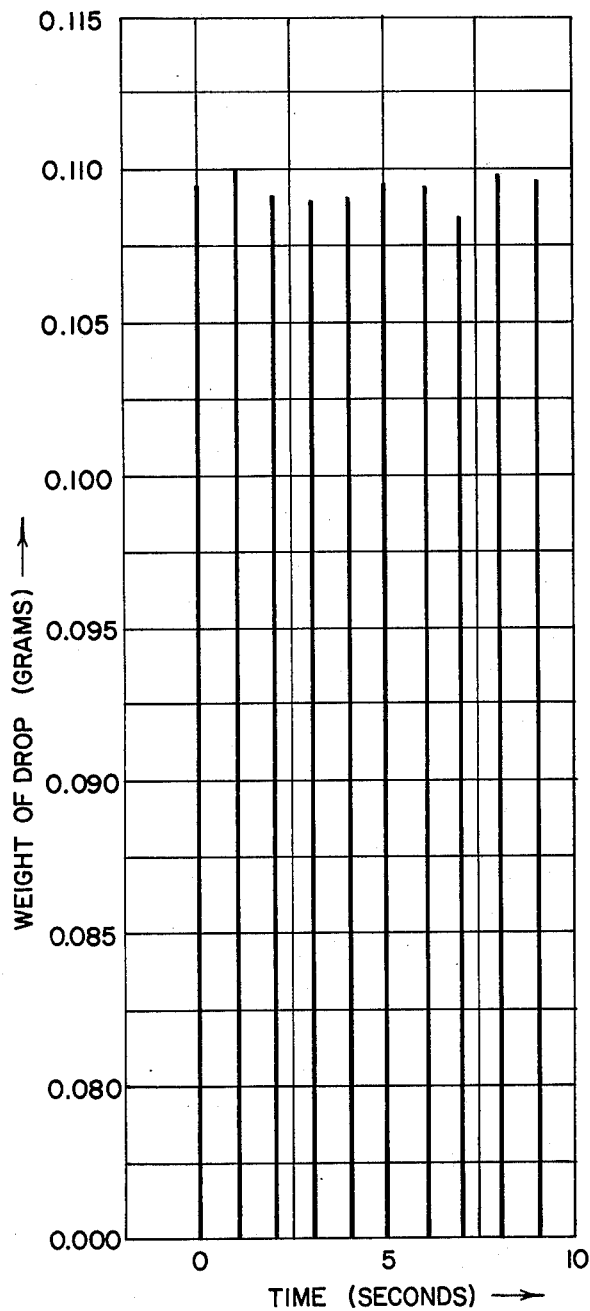
FIG. 9 is a graphic representation of the invention showing the weight of the droplets formed by the length of the vertical lines and the time intervals between drops by the distance between lines.
Figure 10:
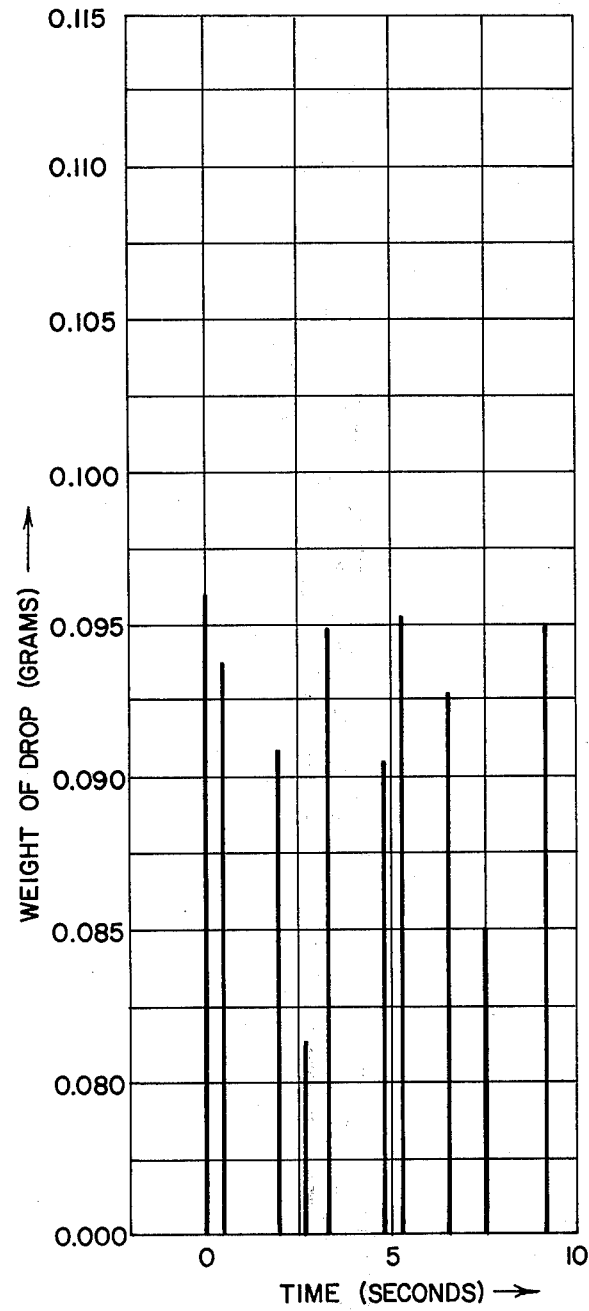
FIG. 10 shows the same graphic representation for a dropping device representing the art.

FIG. 9 shows that very uniform droplets at equal time intervals can be prepared using the present dropping device, whereas a dropping device of the art shown in FIG. 10 gives less uniform drops at uneven time intervals.

DETAILED DESCRIPTION OF THE INVENTION

The resilient tube used in the invention may be constructed of any material that has the requisite resilience to restore itself to its normal shape after compression by the valves or plunger. Many suitable tubular materials are known that possess this property. The most preferred are natural or synthetic rubbers.

The resilient tube may have essentially any inside diameter. The inside diameter is one of the factors that controls the size of the droplets. As the inside diameter is increased, the size of the droplets is normally increased. Preferred in the present invention are those resilient tubes having an inside diameter of about 2 to about 20 mm.

The volume of the droplet is controlled essentially by the volume of liquid displaced by action of the plunger against the resilient tube. Factors other than the displacement of liquid by the plunger, such as spacing between the valves and particular liquid employed, are not important.

The action of the valves and plunger against the resilient tube may vary widely. The valves are adjusted so that flow of liquid through the valve is prevented when the valve is in a closed position. The plunger need only work against the resilient tube to displace the desired amount of liquid; it does not need to displace all of the liquid in that portion of the resilient tube. In the preferred practice of the present invention, the movement of the resilient tube by the valves and plunger is minimized to maximize the life of the resilient tube.

The valves of the device can be constructed in many ways. In the drawing, the valves are blunted knife edges which are pressed against the tube backed by a back plate. Alternative methods of preventing flow of the liquid are possible. For example, the flow could be restricted by a rubber cord which is tightened around the outer circumference of the resilient tube.

The valves and plunger can be driven by many different mechanical means. Usually, hydraulic or camdriven valves and plungers that have an adjustable movement are preferred.

The device of the present invention is especially desirable for the preparation of droplets of a slurry. A slurry is a liquid which has small particles suspended therein. The particulate matter in the slurries tends to wear out any moving mechanical parts in the dropping device that are in contact with the slurry. Also, it is difficult to make uniform droplets of a slurry because the particulate matter in the slurry may cake on the dropping orifices thereby causing resistance to flow.

The device of the present invention solves these problems and is especially useful for making catalysts. The process for making these catalytic materials is described in our copending application Ser. No. 271,387 filed July 13, 1972, now U.S. Pat. No. 3,848,033 of Nov. 12, 1974. Accordingly, the greatest interest of the present invention is the use of the device in the preparation of rounded catalysts from aqueous slurries containing metal oxides or metal oxide precursors.

Of course, in a commercial use of the device of the present invention, more than one tube would normally be employed to give a plurality of uniform and evenly spaced droplets. This is easily accomplished by scaling up the embodiment of the invention shown in FIG. 1 using bars for valves and plungers.

In any event, it is possible by the use of the present invention to produce substantially uniform droplets at uniform spacing. Uniform droplets are important for uniform catalytic beds in catalytic reactions and for uniform dosages in the preparation of medicines. The uniformity of spacing between droplets is important because the problem of two droplets in one time spacing is avoided. In the preparation of catalysts, two droplets in one time space could result in a non-uniform catalyst bed, or in medicine, a double dose would result.

SPECIFIC EMBODIMENTS

Example 1 and Comparative Examples A and B — Device of present invention compared to art A cam-operated dropping device as shown in FIG. 1 was constructed using a 3 mm. inside diameter rubber tube as the resilient tube. A plastic tip having an inside diameter of 3 mm. and being 5.5 cm. long was fitted into the end of the resilient tube. The cams were adjusted to give the operation of the valves and plunger as shown in FIGS. 1-6. The liquid reservoir was filled with an aqueous slurry of metal oxides and silica sol that contained 71 weight percent solids and has a viscosity of 4000 centipoise. The slurry was pumped through the rubber tubing and plastic tip and 20 consecutive drops were caught in pre-weighed vials. The device was run to produce about one drop per second, and the time between the release of droplets from the plastic tip was measured by reading the droplet interval from a timed strip chart for 10 additional droplets at the same operating rate. The vials containing the droplets were weighed and the weight of the droplet calculated.

Comparative Example A

To represent the art, a Sigma pump was used to dispense droplets of liquid by applying pressure on the outside of the resilient tube. Using the same reservoir, slurry, resilient tube and plastic tip, experiments were conducted with the drop rate of about one droplet per second. Ten droplets were also dropped on a timed strip chart.

Comparative Example B

The circular resilient tube used in Example 1 was replaced with a thin-walled, highly flexible, normally flat in repose rubber tube having an internal diameter of ¼ inch as described in U.S. Pat. No. 3,518,033. With the exception of the type of resilient tube used, comparative example B was run using the identical test procedure and conditions of example 1. It was observed that 20 consecutive drops could not be captured from this device. Instead of a uniform drop formation, the flat tube gave an occasional drop followed by a spurt of liquid; therefore, no meaningful data as to drop weight could be obtained. Thus, it is shown that a flat tube is completely unsuitable for droplet formation.

The results of these experiments showing the deviation in weight are given in the Table I below. The average weight is the weight of all droplets over the number of droplets.

Table I

| Example | Variation in Weight | | |
| --- | --- | --- | --- |
| | Average Weight, Grams | ± Deviation from Average | |
| | | Grams | Percent |
| 1 (Invention) | 0.1081 | 0.00166 | 1.5 |
| A (Art) | 0.0901 | 0.0131 | 14.5 |
| B (Art) | no meaningful data | | |

Thus, it is seen from the data above that the deviation in weight for the present invention is very narrow, whereas the use of a Sigma pump allows almost 10 times as much deviation in this comparison.

FIGS. 9 and 10 show a graphic representation of the invention as compared to the use of the Sigma pump. The length of the lines show variation in the weight of the drop. The spacing between the lines shows the variation in the frequency of the droplets to the nearest two hundredths of a second. It is seen from these figures that the interval between drops using the present invention is uniform, whereas the Sigma pump gives an erratic droplet interval.

Example 2 — Different drop rate

The rate of dropping was increased from one drop per second to a rate of ten drops per six seconds. The average weight of the drops over 20 drops was 0.1030 grams. The weight deviation was ±0.0029 grams, and the percent deviation was 2.2%.

Examples 3-6 — Multiport dropping device

A dropping device was constructed using three tubes of 3 mm. internal diameter with plastic tips. All three drops were dropped simultaneously. Using the slurry of Example 1 and a drop rate of approximately one drop per second, the data shown in Table II was obtained. Examples 3-5 show the results obtained by measuring ten drops from each of the three separate tubes. Example 6 is the average of all droplets from the three dropping tubes.

Table II

| Example | Multiport Dropping Device | | |
| --- | --- | --- | --- |
| | Average Weight Grams | ± Deviation from Average | |
| | | Grams | Percent |
| 3 (Single tube) | 0.08496 | 0.00034 | 0.4 |
| 4 (Single tube) | 0.08270 | 0.00052 | 0.6 |

Table II-continued

| | Multiport Dropping Device | | |
|---|---|---|---|
| | Average Weight | ± Deviation from Average | |
| Example | Grams | Grams | Percent |
| 5 (Single tube) | 0.08689 | 0.00086 | 1.0 |
| 6 (Average of three tubes) | 0.0848 | 0.0036 | 4.3 |

It is seen that the uniformity in the weight of droplets for each tube is excellent and that even though three different tubes were used, the deviation in weight of all droplets was only 4.3%. The time between the droplets was uniform.

In the same manner as shown for the aqueous slurry, other liquids, such as molten metal or urea, solutions of various chemicals or slurries of particles in a liquid can be formed into droplets by the device of the present invention.

We claim:

1. A dropping device for forming uniform droplets of a liquid comprising:

a liquid reservoir;

a resilient tube having a substantially circular cross-section in respose and one end connected to said liquid reservoir in such manner that liquid from the liquid reservoir can flow through the resilient tube and out of a second end, said second end being in a vertical position and being capable of retaining liquid within said tube, and producing a uniform and distinct drop when force is asserted on the outer surface of said resilient tube;

a first valve which is located toward the second end of said resilient tube and being capable of restricting the flow of liquid through the resilient tube by action on the outer surface of said resilient tube in a closed position and allowing flow of liquid through the resilient tube in an open position;

a second valve located along the resilient tube between said first valve and said liquid reservoir and being capable of restricting the flow of liquid through the resilient tube by action on the outer surface of said resilient tube in a closed position and allowing flow of liquid through said resilient tube in an open position; and a plunger located between said first valve and said second valve, said plunger being capable of applying force on the outer surface of the resilient tube when said second valve is in the closed position and said first valve is in the open position, whereby a uniform and distinct drop is produced from said second end of the resilient tube.

2. The process of forming droplets from a slurry consisting of a suspending liquid and small particles suspended in the liquid comprising:

using as the dropping device the device of claim 1.

3. The process of claim 2 wherein the slurry consists of an aqueous mixture of metal oxides or metal oxide precursors.

* * * * *